United States Patent [19]
Aurik et al.

[11] Patent Number: 6,098,570
[45] Date of Patent: Aug. 8, 2000

[54] CLEANING DEVICE FOR CLEANING A TEAT OF AN ANIMAL

[75] Inventors: Erik Arnoldus Aurik, Amsterdam; Pieter Adriaan Oosterling, Nieuw-Vennep, both of Netherlands

[73] Assignee: Prolion B.V., Vijfhuizen, Netherlands

[21] Appl. No.: 09/033,260

[22] Filed: Mar. 2, 1998

Related U.S. Application Data

[62] Division of application No. 08/693,269, Oct. 3, 1996, Pat. No. 5,722,343.

[30] Foreign Application Priority Data

Feb. 17, 1994 [NL] Netherlands ............................ 9400241
Feb. 17, 1995 [WO] WIPO ...................... PCT/NL95/22246

[51] Int. Cl.⁷ .................................................. A01K 13/00
[52] U.S. Cl. .......................................... 119/604; 119/665
[58] Field of Search .................................... 119/601, 602, 119/603, 604, 650, 651, 652, 654, 662, 665, 667, 669

[56] References Cited

U.S. PATENT DOCUMENTS

| | | |
|---|---|---|
| 3,713,423 | 1/1973 | Sparr, Sr. ................................. 119/158 |
| 3,841,756 | 10/1974 | Grochowicz . |
| 4,047,500 | 9/1977 | Bender et al. . |
| 4,376,053 | 3/1983 | Bullock et al. . |
| 4,385,590 | 5/1983 | Mortensen . |
| 4,565,160 | 1/1986 | Cook ....................................... 119/159 |
| 5,235,937 | 8/1993 | Farina et al. ............................ 119/158 |
| 5,390,627 | 2/1995 | Van Der Berg et al. ............. 119/14.08 |
| 5,628,964 | 5/1997 | Tassitano . |
| 5,673,650 | 10/1997 | Mottram et al. ........................ 119/651 |

FOREIGN PATENT DOCUMENTS

| | | |
|---|---|---|
| 2139360 | 1/1973 | France . |
| 2257008 | 1/1993 | United Kingdom . |

*Primary Examiner*—John S. Hilten
*Attorney, Agent, or Firm*—Webb Ziesenheim Logsdon Orkin & Hanson, P.C.

[57] ABSTRACT

A cleaning device is provided for cleaning a teat of an animal. The cleaning device has a housing with a first wall, a second wall and teat receiving passage. The first wall is spaced from the second wall to form a space between the first and second walls. An outlet opening is formed in the device in flow communication with the teat receiving passage and the space between the first and second walls. A feed conduit is in flow communication with the space between the first and second walls for supplying a cleaning medium to the cleaning device. A flow guiding member is located in the space to guide the flow of cleaning medium through the space to the outlet opening. The first and second walls preferably include spaced apart flanges extending substantially parallel to each other to form the outlet opening.

17 Claims, 4 Drawing Sheets

CLEANING DEVICE FOR CLEANING A TEAT OF AN ANIMAL

CROSS REFERENCE TO RELATED APPLICATION

This application is a divisional of U.S. patent application Ser. No. 08/693,269, filed Oct. 3, 1996, now U.S. Pat. No. 5,722,343, and entitled "Method For Controlling A Milking Processing System And A Device Controlled By Said Method".

BACKGROUND OF THE INVENTION

The invention relates to a method for controlling a milking processing system wherein milk is extracted at each teat of a mammal such as a cow and is subsequently stored for a longer period.

It is known, particularly in automatically operating milking devices, to filter the drained milk before it is stored in a collection tank (see U.S. Pat. No. 4,385,590). Filtering of the milk serves to enable removal from the milk of possible contamination resulting from teat fouling etc. Systems are further known in which for instance the temperature of the milk is measured to determine whether a cow for milking has mastitis. This usually involves the use of temperature sensors.

The invention has for its object to provide a more comprehensive system for milking control such that the milking device can be controlled in optimal manner.

SUMMARY OF THE INVENTION

The control method according to the invention is distinguished in that prior to storing of the milk it is at least partially or wholly filtered in the connecting conduit to the storage device. The filtered residue is carried outside the conduit and subsequently detected and in the case of a predetermined variation of the or each animal a signal thereof is generated for the control.

Due to the detection of the filtered residue outside the milk conduit system, detection can be carried out better and the obtained signals are more readily available to the control system and therefore to an automatic milking device.

A signal can for instance be used to set into operation a valve system for draining contaminated or infected milk to an auxiliary tank. This valve system is therefore controlled on the basis of data of a single specific animal which is then being milked.

It is on the other hand possible to use the signals to set into operation auxiliary equipment of the milking device, for instance to replace the filter material or a teat cleaning appliance, if it is established that much dirt is present on the udders as a result of rainfall and the like.

It may be possible within the scope of this milk residue detection to actuate functions of the milking machine other than those stated above.

The invention further relates to a device for milking a mammal such as a cow and controlled according to any of the foregoing ways. The device includes at least one milking location which is provided with one or more teat cups, each of which can be placed on a teat of the animal for milking and which is connected to a milk conduit for draining the milk to a storage tank. And apparatus for filtering the milk is arranged in the milk conduit. The device according to the invention is distinguished in that the filtering apparatus has a filter which may or may not be exchangeable, wherein a detection means associated with the filter generates a signal when predetermined contaminants are detected on the filter.

In one embodiment the filter for such a milking device is embodied as a band which is trained step-wise through the filter housing. Each time there is a change of the animal for milking a new filter can thus be arranged automatically in the filter housing.

The invention finally relates to a milking device which is provided with an automatically driven milking arm. According to the invention this milking arm is also suitable for arranging a cleaning cylinder round the teat of a cow, wherein in one embodiment the cleaning cylinder can be placed by the milking arm as stand-alone element, thus separately of the teat cup, while in another embodiment the cleaning cylinder can be fixedly mounted on the teat cup, wherein the milking arm places either the cylinder or the teat cup round the teat. These latter steps can take place successively.

BRIEF DESCRIPTION OF THE DRAWINGS

Above mentioned and other features of the invention will be further elucidated hereinbelow in a figure description of a number of embodiments. In the drawings.

DESCRIPTION OF THE PREFERRED EMBODIMENTS

Figure 1:
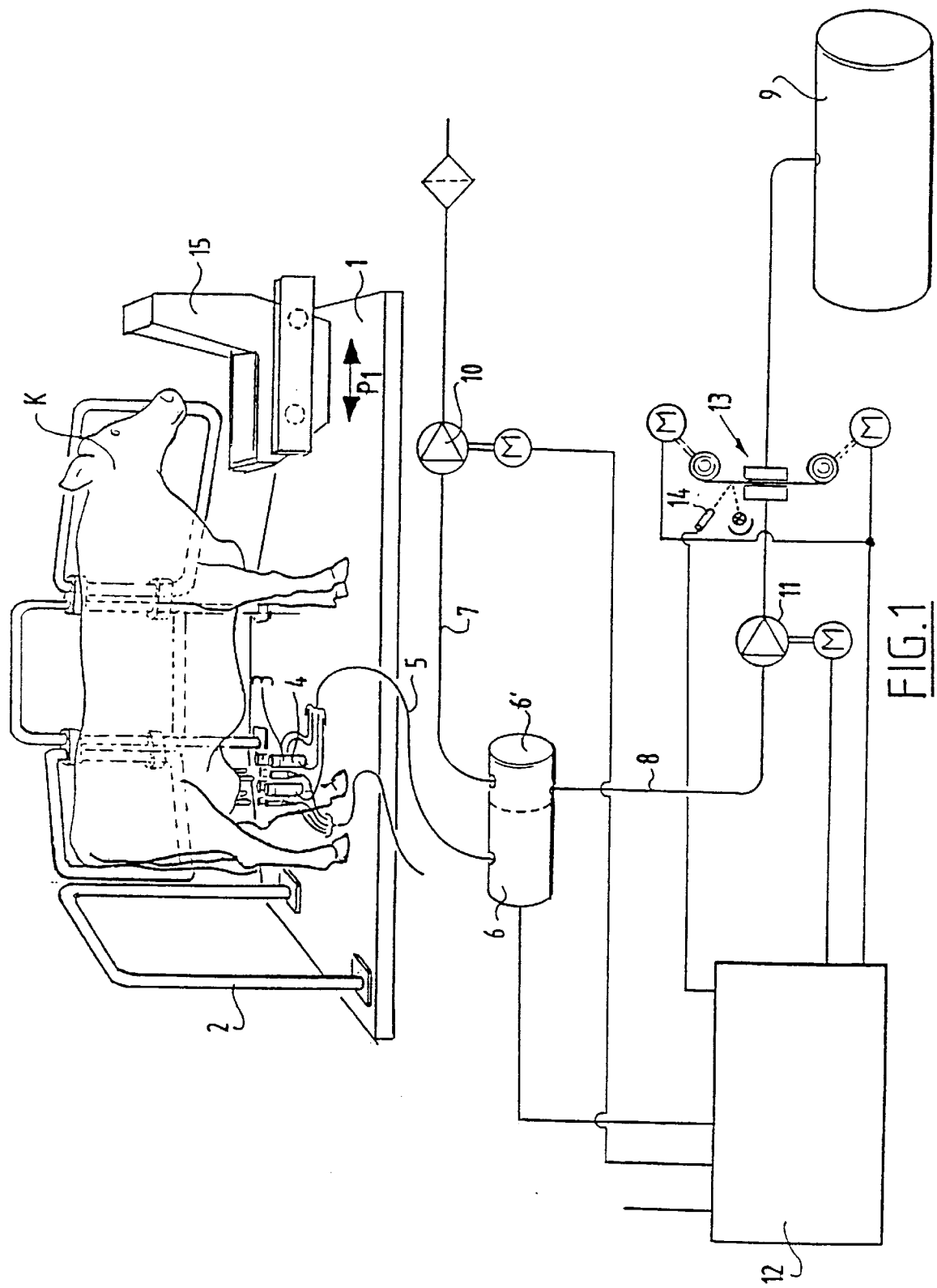
FIG. 1 shows a schematic diagram of a milking parlour provided with a feed trough, guide fences and a milking set having connected thereto milk conduits with control and storage equipment.

Designated in FIG. 1 with the numeral 1 is the milking parlour on which an animal for milking, for instance a cow K, can be placed and held in its position by a fence 2 of random configuration. In the case of an automatically operating milking device use is usually made of a feed trough 15 which is reciprocally movable in the direction of arrow P1 to assist in correctly positioning the animal for milking.

Arranged under the animal for milking and above the floor of milking parlour 1 is a milking rack 3 which is fixed in a manner not shown to a control arm or which can be coupled collectively or each separately in a manner not shown to an automatically driven robot arm in order to place the teat cup 4 on the teat of the animal for milking. Each teat cup is connected via a milk take-off conduit 5 to a buffer tank 6 provided with a driven valve housing 6' onto which connect a milk conduit 7 for reject milk and a milk conduit 8 for draining the extracted milk to a storage tank 9. In both milk conduit 7 and milk conduit 8 is arranged a pump 10 and 11, respectively, driven by motors M, wherein the motors are driven by a central control system 12. The control system 12 also actuates the valve housing 6'.

In the control system 12 may also be included in known manner provisions such-as a memory, in which data of individual cows is held, while means are arranged in milking parlour 1 with which the identity of the cow for milking can be determined. Further incorporated in known manner in the milking system are vacuum connections which provide for transport of the milk from the teat cups to the valve block and wherein the milk is temporarily stored before it is pumped to the storage tank or the reject milk tank.

Also arranged in the milk conduit 8 is a filtering apparatus 13 which is further elucidated hereinbelow. The filtering apparatus has a detection means 14, the output signal of which leads to the control system 12. It is also possible however for the filtering apparatus to be placed in the conduit 5 before the valve block 6.

Figure 2:
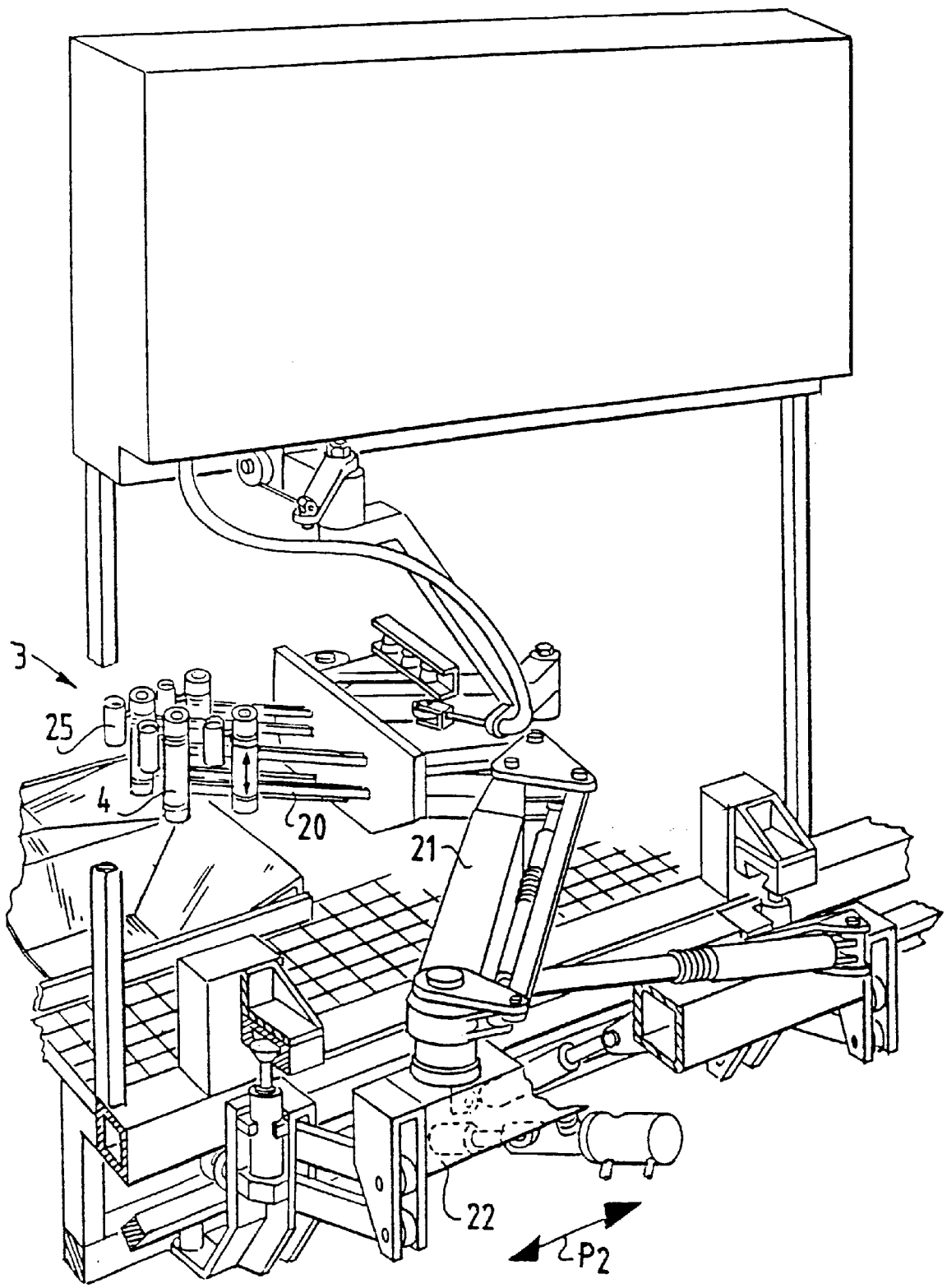
FIG. 2 is a perspective top view of a milking rack on a driven arm provided with a cleaning device according to the invention.

FIG. 2 shows on a enlarged scale the milking rack 3 with the teat cups 4. Each teat cup is suspended via a parallel guide 20 on a driven arm 21, which arm has a number of rotation points and is mounted on a carriage 22 which can be moved along the milking location in the direction of arrow P2. The arm can be rotated under the cow such that the teat cups come to lie beneath the teats of the udder. By means of sensors (not shown) of a random nature the teat cups can be placed successively on the teats of the cow. This art is per se known and otherwise falls outside the scope of the invention.

Figure 3:
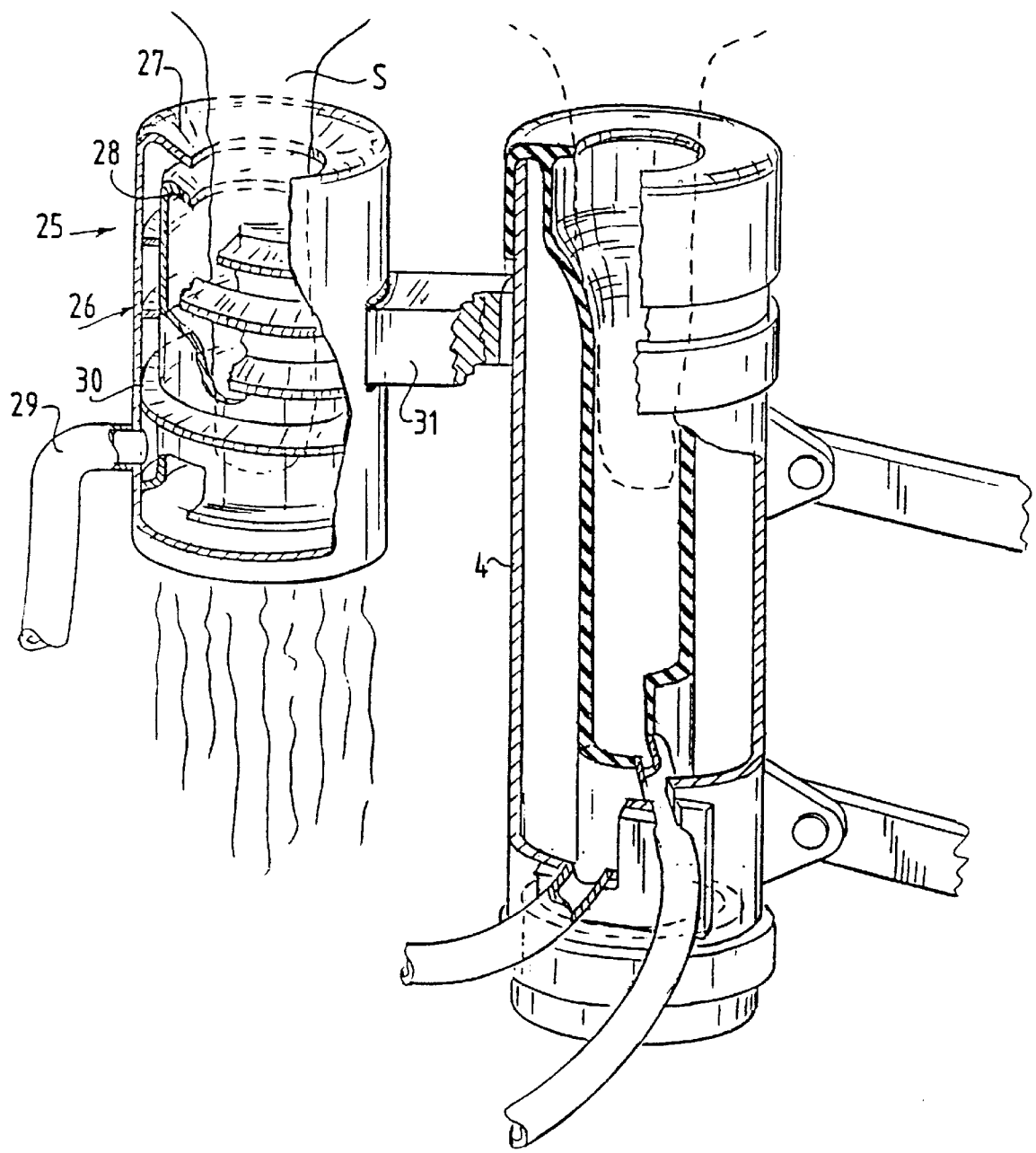
FIG. 3 is a perspective, partially sectional view of a larger detail of the cleaning device with teat cup.

Arranged in each case according to the invention on a teat cup 4 is a cleaning device 25 which is shown in detail in FIG. 3 on larger scale. The cleaning device 25 consists of a cylindrical housing which takes a double-walled form in the embodiment shown. The first or outer wall is provided on the upper edge with a flange 27 oriented downward and inward, while the second or inner wall has a parallel flange 28. The inside edge of both flanges is such that it fits loosely round the teat S of the animal for milking. The underside of cylinder 25 is open. The space between the two walls of the housing is connected to a feed conduit 29 for a flushing liquid. Further arranged in the space between the two walls is a flow guiding member 30, having here a spiral shape. Other embodiments are possible within the scope of the invention, for instance blades or fins which are disposed fixedly or adjustably.

After having been placed round the teat S the cylindrical housing 26 is provided via the conduit 29 with flushing liquid which is forced upward into the space between the double wall of housing 26 and flows out into the slot-like circular opening round the teat S at the top of the housing. The flushing liquid flows out at an angle oriented inward and downward relative to the centre line of the housing as a result of the position of the parallel flanges 27, 28. The flushing liquid is therefore sprayed against the teat S and then runs downward through the housing 26. The direction in which the flushing liquid flows out from the slot-like opening between flanges 27, 28 is likewise determined by the liquid guiding means 30, whereby the liquid can undergo a rotational movement relative to the centre line, which contributes to a better cleaning action on the teat.

In accordance with a particular feature of the invention the housing 26 is joined fixedly via a support 31 to the outer wall of a teat cup 4.

This provides the advantage that the control for placing a teat cup can also be used for arranging the cleaning cylinder 25. The fixed distance between housing 26 and teat cup 4 can be input simply in the control software as fixed data so that use can be made of the same sensor means to localize the teat which must be cleaned respectively milked.

It is noted that the location of the cleaning device 25 in relation to the teat cup 4 is preferably to the rear of the teat cup in order not to obstruct the direction of movement for transporting the teat cup toward the teat in an automatic milking device. It is further noted that the flushing liquid supplied through conduit 29 to housing 26 can be substituted by an air flow to dry the teat, wherein the supply can take place alternatingly.

The method for cleaning the teats can now take place as follows: Under normal conditions, wherein the udders of the cows are not dirtied, no use is made of the separately arranged cleaning options. After arranging of the teat cup 4 round the teat S and starting of the milking process, the milk is drained via milk conduit 7 for reject milk for a short time, from several to for instance ten seconds after starting of the milking. After the preset time has passed, the driven valve housing 6' switches the milk flow to milk conduit 8 and storage tank 9. In this way the slightly caked and perhaps even infected milk present in the opening of the teat is separated from the milk of the desired quality. In exceptional conditions there is considerable dirtying of the udders of all animals in the herd, for instance when it has rained. In these conditions or for instance in the context of a periodic cleaning session, the farmer can instruct the control that the teats of all cows have to be treated by cleaning the teats on the outside with an excess of liquid. Use is made for this purpose of the cleaning device 25. Because this cleaning takes place occasionally it is no great drawback that it takes some time, because the capacity of the system is not affected too adversely.

Figure 4:
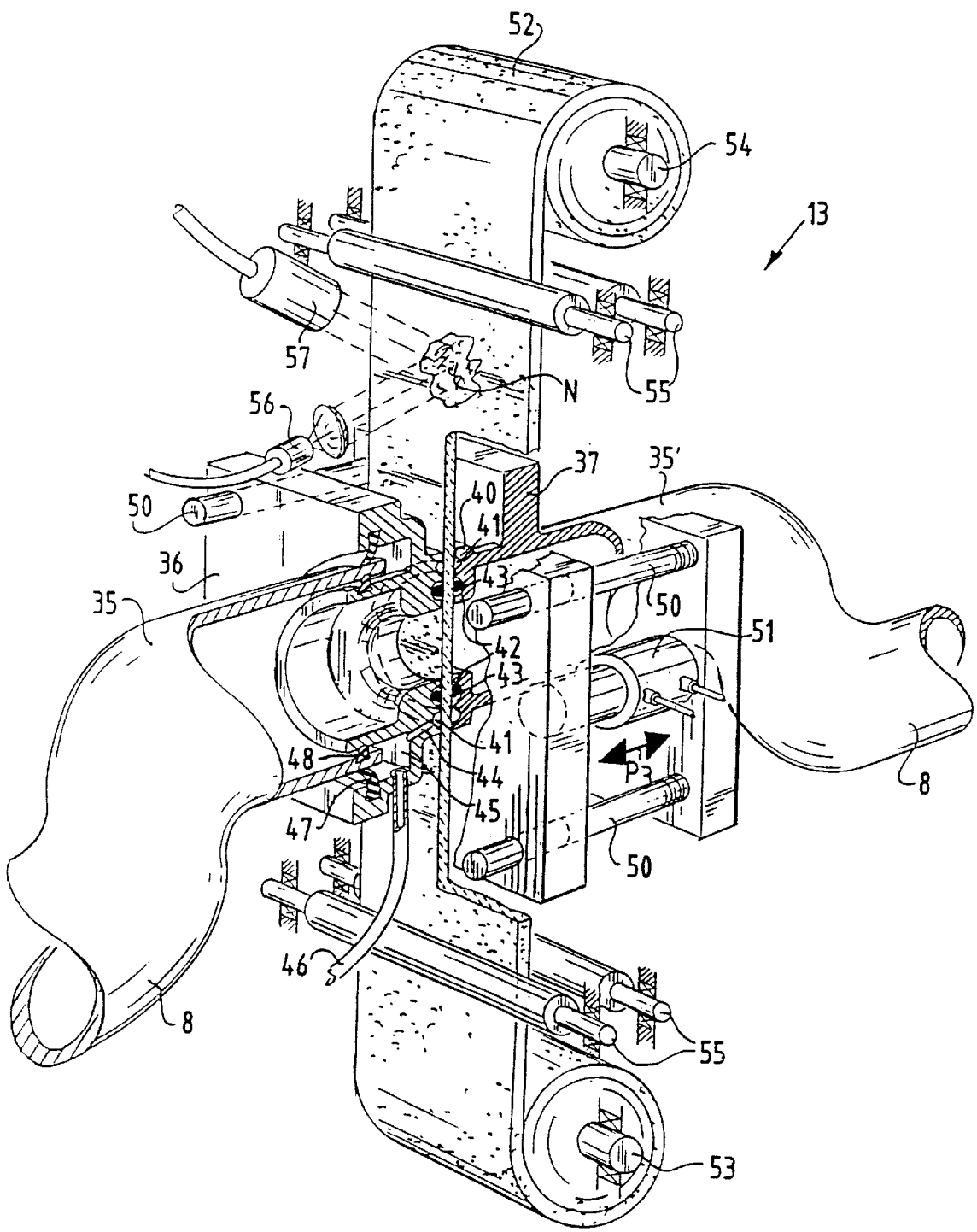
FIG. 4 is a perspective, partially sectional view of a filtering apparatus suitable for the milk processing system of FIG. 1.

The filtering apparatus 13 according to FIG. 4 is now further elucidated. The filtering apparatus 13 is incorporated in the conduit 8 to the storage tank 9.

The conduit 8 is provided locally with a portion 35 which is displaced relative to conduit 8. The portion 35 is then mounted such that it comes to lie in a higher position than the passage of conduit 8.

The filter consists of two housing parts 36, 37 which are connected sealingly to the two mutually opposite displaced portions 35 and 35'. Each of the housing parts 36 and 37 is provided on the mutually facing side with an annular flange 40 into-which are recessed two channels 41 and 42. Channel 42 serves to receive a sealing ring or O-ring 43. Channel 41 serves as a flushing channel and is connected for this purpose via a connecting channel 44 to a flushing space 45 which is coupled to a feed hose 46. The flushing space 45 is formed by an annular recess in the housing part 36 into which protrudes the end part of conduit part 35. A sealing ring 47 and 48 is arranged on either side of the conduit part. By supplying liquid via conduit 46 the chamber 45 can be filled and therefore also channel 41 via conduit 44.

The housing parts 36 and 37 are mutually joined via guides 50 which enable a movement in the direction of the arrow P3. Arranged between both housing parts is a cylinder 51 which provides the movement of housing parts 36 and 37.

Between the annular flanges 40 of both housing parts is a band of filter material 52 which is unwound from a lower reel 53 and can be wound onto an upper reel 54. The driving of the band can take place by drive rollers 55, but can also take place by driving the shaft of the reel 54. It will be apparent that the band is trained from the lower reel upward between housing parts 36 and 37 to the upper reel.

This movement can only take place by moving the housing parts 36 and 37 slightly apart, whereby filter material situated in the passage through housings 36 and 37 can be replaced by a fresh portion. As soon as the fresh portion has been placed the cylinder 51 is energized such that the sealing rings 43 are pressed firmly against the surface on either side of the band 52. Filter material can thus be replaced each time.

By supplying liquid in the conduit 46 after replacing fouled filter material with clean material and after clamping the filter housing round the filter material, the filter material at the position of channel 41 becomes wet and there is hydrostatic pressure in the filter material, whereby the liquid pumped through conduit 35 cannot flow to the outside at that position. For this purpose the hydrostatic pressure in channel 41 must be higher than the pressure in conduit 35.

As it is also possible that filter apparatus 13 is placed in the vacuum part of the milking system and that underpressure therefore prevails in conduit 35, it is in that case important that liquid is supplied via conduit 46, whereby the filter material forms together with this liquid the sealing against leakage of air to the underpressure in conduit 35.

According to the invention a detector 57 is placed above filter housing 36, 37, which detector 57 senses the reflection from a light source 56. By applying a dark colour in the filter material possible precipitation N from clotted milk can be detected, which causes a signal at the detection means 57. This detector 57 can be embodied as a light sensor or also as CCD camera, whereby more information about the contamination is obtained. On the basis of the precipitation detected by the detector the control 12 coupled to the detector can decide whether contamination is caused by dirtying, mastitis infection or has another cause. Other properties of the contamination can also be determined, for example the quantity and nature of the contamination. The result of such a decision may be that in future milking sessions the milk is separated and that the cow is for instance also separated and/or that the operator is alerted. On the basis of repeated detection it can be concluded whether the contamination is specific to one animal or whether it occurs in the whole herd.

Immediately after pumping of the milk through filter 13 has been terminated, the pressure on either side of band material 52 can be relieved by energizing cylinder 51, and filter material can be replaced. Prior thereto a washing cycle can take place via channel 41. It is noted in this respect that, due to the elevated location of the portion 35 in relation to conduit 8, no milk can flow out of conduit 8 when the filter material is being changed, since all milk has flowed away to both sides of the elevated portion.

In another embodiment of the filtering installation according to the invention both rolls with filter material are driven by a motor and the control is adapted such that, in the case it is found during inspection that the filter is not fouled, or is fouled very little, the filter material can be re-used. Since only a limited number of cows will be infected a considerable saving of filter material is obtained herewith.

Other embodiments of the above described embodiments are possible within the scope of the invention.

What we claim is:

1. A cleaning device for cleaning a teat of an animal, the cleaning device comprising:
    a feed conduit for supplying a cleaning medium;
    a housing having an open top side for receiving the teat and an open bottom side for draining the cleaning medium admitted into the housing via the feed conduit; and
    at least one outlet opening for the cleaning medium arranged in the housing and in flow communication with the feed conduit, wherein:
        the housing has at least one flange beneath which the outlet opening is situated;
        the at least one flange is configured to loosely fit around the teat; and
        the cleaning device is connected to a teat cup for milking the animal.

2. The cleaning device as claimed in claim 1, wherein the housing has a double-walled form and the feed conduit debouches into the space between the double wall.

3. The cleaning device as claimed in claim 2, wherein the housing has a first flange and a second flange, with the second flange arranged round an upper edge of an inner wall substantially parallel to the first flange to form a slot-like outlet opening.

4. The cleaning device as claimed in claim 3, wherein flow guiding members are located in the space between the walls of the housing to obtain a flow of the cleaning medium round a centre line of the cylindrical housing.

5. The cleaning device as claimed in claim 1, wherein the teat cup is connected to an automatically driven arm, and wherein a centre line of the cleaning device housing is substantially parallel to a centre line of the teat cup and the cleaning device is located at a substantially fixed distance from the teat cup.

6. The cleaning device as claimed in claim 5, wherein the housing of the cleaning device is mounted at the substantially fixed distance to the side of the teat cup remote from the arm.

7. The cleaning device as claimed in claim 1, wherein the teat cup has a top side and wherein the bottom side of the housing is located below the top side of the teat cup.

8. The cleaning device as claimed in claim 1, wherein the teat cup has a top side and top side of the housing and the top side of the teat cup are at substantially the same level.

9. The cleaning device as claimed in claim 1, wherein the cleaning medium is selected from the group consisting of liquid and gas.

10. A cleaning device for cleaning a teat of an animal, the cleaning device comprising:
    a housing having a first wall and a second wall, with the first wall spaced from the second wall to form a space between the first and second walls;
    an outlet opening in flow communication with the space between the first and second walls, the first wall including a first flange and the second wall including a second flange, with the first flange spaced from the second flange to form the outlet opening; and
    a feed conduit in flow communication with the space, the feed conduit configured to supply a cleaning medium through the space to the outlet opening to clean the teat.

11. The cleaning device as claimed in claim 10, including a teat receiving passage extending through the cleaning device to receive the teat for cleaning, with the outlet opening in flow communication with the teat receiving passage.

12. The cleaning device as claimed in claim 10, including a flow guiding member located in the space between the first and second walls to guide the flow of cleaning medium through the space to the outlet opening.

13. The cleaning device as claimed in claim 10, wherein the cleaning device is mounted on an automatically driven arm configured to engage the cleaning device with a teat of the animal.

14. The cleaning device as claimed in claim 10, wherein the first flange extends at an angle from the first wall and the second flange extends substantially parallel to the first flange.

15. A cleaning device for cleaning a teat of an animal, the cleaning device comprising:

a housing having a first wall, a second wall and a teat receiving opening, wherein the first wall is spaced from the second wall to form a space between the first and second walls;

an outlet opening in flow communication with the teat receiving opening and the space between the first and second wall;

a feed conduit in flow communication with the space between the first and second walls for supplying a cleaning medium to the cleaning device; and a flow guiding member located in the space to guide the flow of cleaning medium through the space to the outlet opening, wherein the first wall includes a first flange and the second wall includes a second flange, with the first flange spaced from the second flange to form the outlet opening.

16. The cleaning device as claimed in claim 15, wherein the device is attached to a teat cup of a milking machine, with the cleaning device located at a substantially fixed distance from the teat cup.

17. The cleaning device as claimed in claim 15, wherein the first flange extends at an angle from the first wall and the second flange extends substantially parallel to the first flange.

* * * * *